United States Patent [19]

Boisset

[11] 4,386,805
[45] Jun. 7, 1983

[54] SEATS WITH AN ADJUSTABLE-TILT BACK-REST

[75] Inventor: Bernard Boisset, Etampes, France

[73] Assignee: Societe Industrielle Bertrand Faure, Etampes, France

[21] Appl. No.: 246,948

[22] Filed: Mar. 24, 1981

[30] Foreign Application Priority Data

Mar. 26, 1980 [FR] France ............................... 80 06769

[51] Int. Cl.³ ............................................. A47C 1/025
[52] U.S. Cl. ..................................... 297/362; 297/355
[58] Field of Search ............... 297/362, 361, 358, 354, 297/355, 329, 383; 248/420, 429

[56] References Cited

U.S. PATENT DOCUMENTS

| 137,091 | 3/1873 | Parker | 297/329 X |
| 1,970,577 | 8/1934 | Schauss | 297/329 X |
| 2,299,538 | 10/1942 | Goldstein | 297/329 |
| 3,445,143 | 5/1969 | Swenson | 248/429 X |
| 3,672,625 | 6/1972 | Cazabon et al. | 248/429 X |
| 3,710,418 | 1/1973 | Kratzer | 297/362 X |

FOREIGN PATENT DOCUMENTS

| 1923159 | 11/1970 | Fed. Rep. of Germany | 248/420 |
| 2735522 | 2/1979 | Fed. Rep. of Germany | 297/354 |

Primary Examiner—William E. Lyddane

[57] ABSTRACT

To enable the inclination of the metal framework of a seat-back of a vehicle seat to be adjusted with respect to the metal framework of the seat-bottom of this seat, elements of these two frameworks are constituted in the form of curvilinear sectional bars (6, 7) nestable contiguously in one another and centered on the same transverse horizontal axis positioned close to the pivoting axis of the hips of a person sitting on the seat and an adjusting and locking mechanism (13, 14) is provided enabling the degree of mutual fitting into one another of these sectional bars to be adjusted as desired.

8 Claims, 5 Drawing Figures

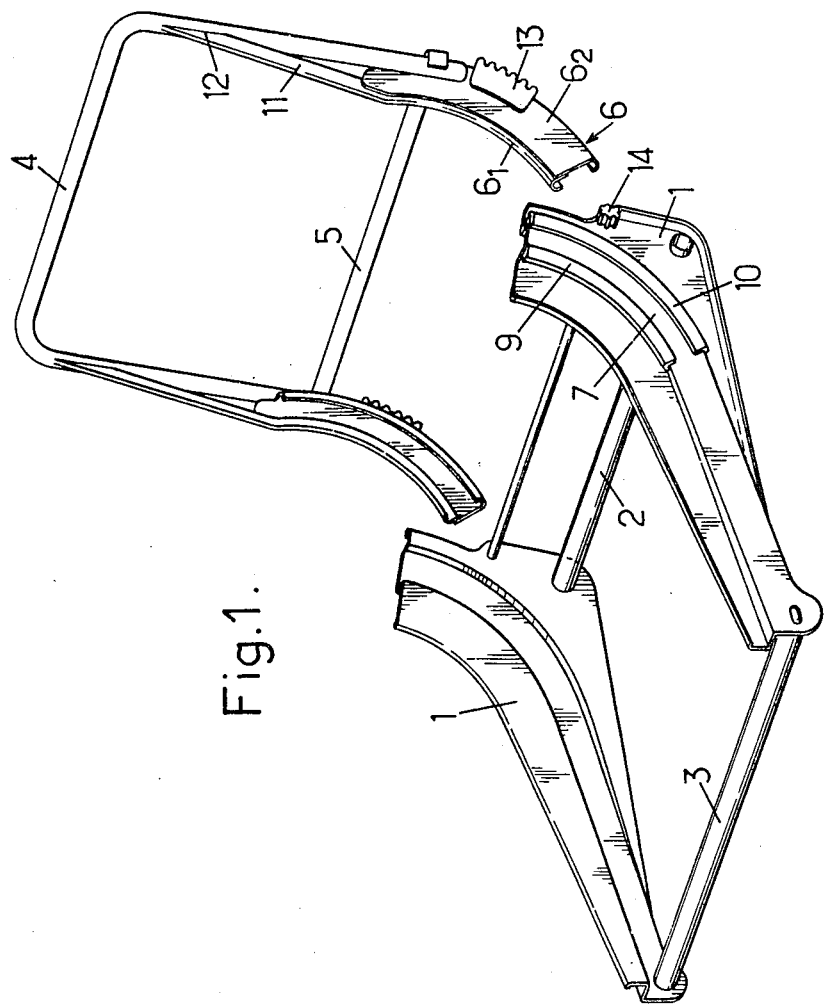

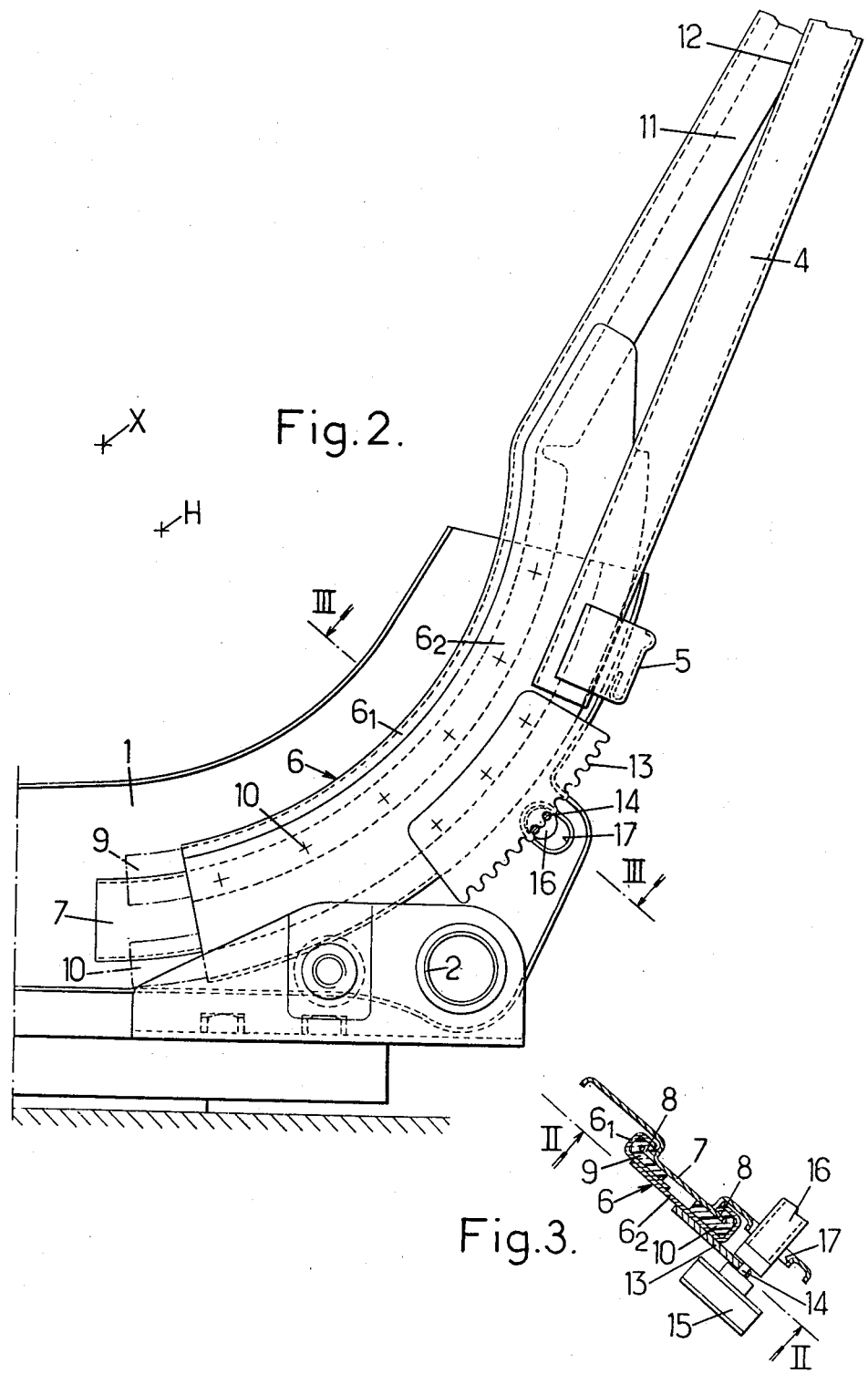

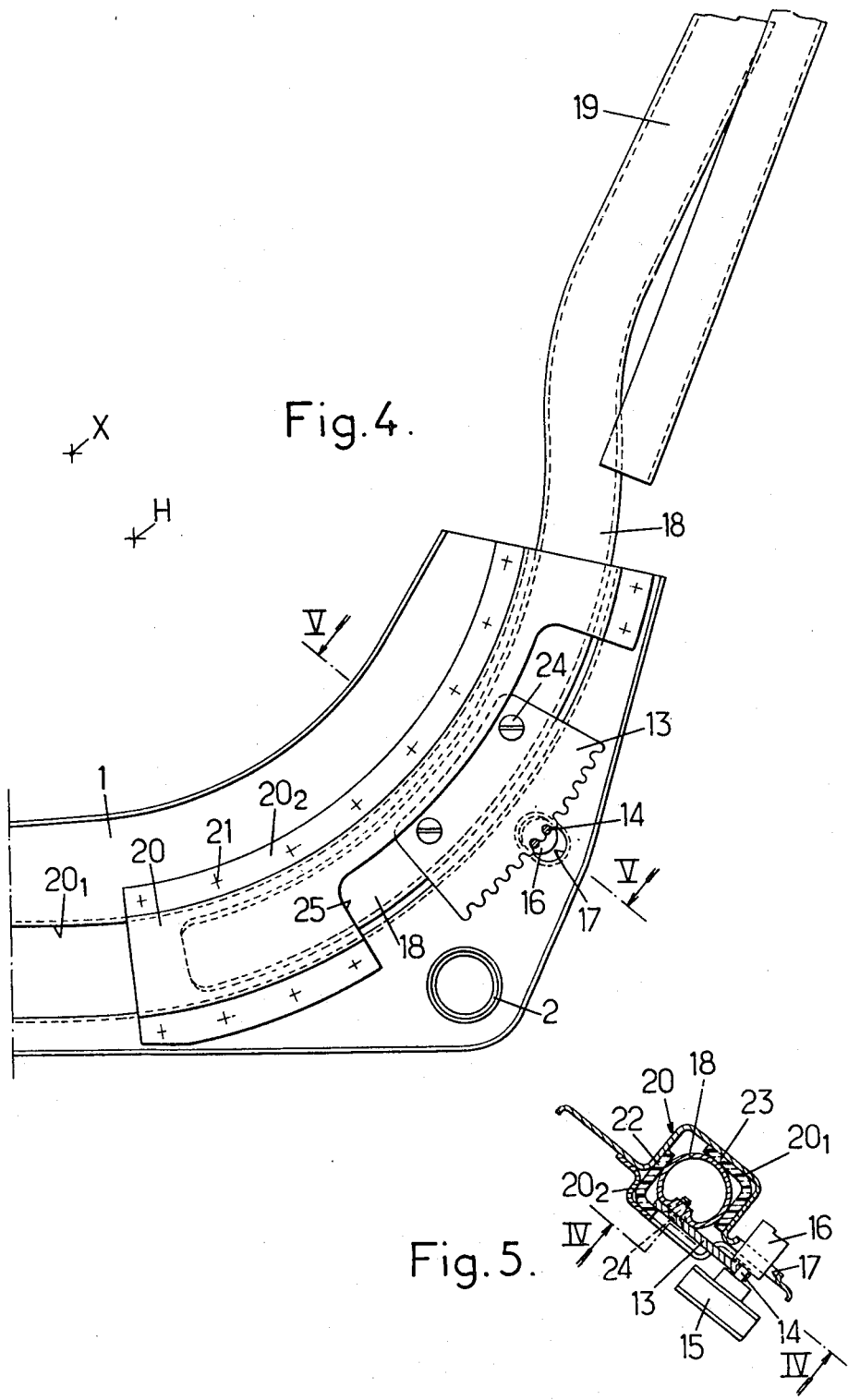

SEATS WITH AN ADJUSTABLE-TILT BACK-REST

BACKGROUND OF THE INVENTION

1. Field of the Invention

The invention relates to seats with adjustable-tilt back-rests, notably for vehicles.

2. Description of the Prior Art

In general the back-rests of these seats are mounted to pivot around a transverse axle positioned in the rear lower zone of the seat and means are provided to lock the back-rest in a certain number of distinct angular positions around the axle.

This solution necessitates recourse to parts (shafts, bearings, pins...) which must be machined accurately and must have high mechanical strength in order to withstand the forces concentrated in the vicinity of the axle: hence these parts are relatively expensive.

Such a solution not being applicable to seats of which at least the seat-bottom framework is constituted by a shell, the present inventor has quite recently had the idea of constructing the articulation of the seat-back, in this particular case, by means of additional curvilinear slide elements centered on the same transverse axle advantageously situated in the vicinity of the pivoting axis of the hips of the person sitting on the seat, said elements being borne, on each side of the seat, respectively by the rear portions of vertical wings of the seat-bottom shell and by the bases of vertical side flanges of the back-rest.

The slide elements concerned were then constituted essentially by concentric grooves and ribs forming respectively hollows and projections on said wings and tabs.

The latter construction principle has notable advantages (lightness, simplicity of manufacture, economy...) due to the fact notably of the distribution of the forces over relatively extended bearing surfaces.

Another object of the invention is to eliminate the usual pivoting axis and the "hard point" that its presence frequently creates at the back of the seat-bottom cushion.

Another object is to provide such a seat of which it is relatively easy to adjust the seat-back tilt by the cooperation of at least one curved rack centered on the transverse axis of the slides and fast to one of the two frameworks with at least one rotary toothed member easily actuatable by the seated person and mounted on the other framework.

It is another object of the present invention to apply the above construction principle to seats the seat-bottom and back-rest frameworks of which are in the general shape of frames constituted by metal bracing elements.

The invention relates more particularly to those seats of the type concerned, of which the framework of the back-rest comprises two incurved metal sectional bars arranged respectively on the two sides of the back-rest, each extending downwardly and forwards the base of one of the sides of this back-rest and centered on the same horizontal transverse axle situated in the vicinity of the pivoting axis of the hips of the person sitting on the seat, these sectional bars being adapted to coact with guide members of the seat bottom and means being provided to adjust the relative positions of the sectional bars with respect to the guide members and to block them in a plurality of distinct mutual positions.

In known embodiments of such seats, constituting office chairs, the sectional bars are constituted by curved tubes and the guide members are constituted, for each tube, by two pairs of rollers.

Such a construction is not sufficiently robust to be applied to a vehicle seat.

GENERAL DESCRIPTION OF THE INVENTION

According to the invention, such a seat comprises guide members constituted by two incurved metal sectional bars forming part of the seat-bottom framework, centered on the abovementioned transverse axle and adapted to cooperate by sliding interfitting with the two sectional bars fof the backrest.

In preferred embodiments, recourse is additionally had to one and/or other of the following features:

one of the mutually interfitted incurved sectional bars has in cross-section an enveloping shape adapted to surround the other sectional bar over more than half its perimeter, and preferably over at least three quarters of its perimeter;

the angular extent of the mutually interfitted sections of the sectional bars is comprised between 45° and 90°, being preferably of the order of 60°, the length of the curved section constituted by the cross-section of the mutual contact surface of two mutually interfitted sectional bars is small with respect to the longitudinal dimension of said contact surface, this length being preferably at least twice as small as this longitudinal dimension.

Lines constituted of a material having a low coefficient of friction and a good wear resistance are interposed between the two sectional bars so that the sliding contacts between the latter are localised between one of these sectional bars and these liners, fast to the other sectional bar.

The invention comprises, apart from these main features, certain other features which are preferably used at the same time and which will be more explicitly explained below.

In the following, two preferred embodiments of the invention will be described with reference to the accompanying drawings given purely by way of non-limiting example.

BRIEF DESCRIPTION OF THE DRAWINGS

FIG. 1, of the drawings, is a perspective view of an embodiment of a vehicle seat according to the invention of which the two seat-bottom and back-rest frameworks are here separated from one another.

FIGS. 2 and 3 show the same embodiment with two frameworks mounted on one another respectively in side view, with portions in section along the line II—II in FIG. 3, and in cross-section along the line III—III in FIG. 2.

FIGS. 4 and 5 show another embodiment of a seat according to the invention, again with its two frameworks mounted on one another, respectively in side view, with portions in section along the line IV—IV of FIG. 5, and in transverse section along V—V of FIG. 4.

DESCRIPTION OF PREFERRED EMBODIMENTS

In the drawings, in each case, the seat-bottom framework is a frame constituted by two vertical metal cheeks 1 of generally triangular shape tapered forwards and cross-braced transversely by two horizontal tubes 2, 3, and the back-rest framework comprises an arch-shaped member 4 of which the two limbs can be connected by a transverse horizontal cross-brace 5.

Certain constituent elements of these two frameworks are also arranged so that they form, on each side of the seat, a pair of incurved metal sectional bars belonging respectively to the seat-bottom framework and to the back-rest framework and which can be fitted into one another in order to slide mutually, these sectional bars being centered on the same transverse horizontal axis X.

This axis X is arranged:

neither in the bottom rear zone of the seat, like conventional hinge axes, nor in the zone, relatively high and forwards, where the center of curvature of the circular arc passing respectively through the front end of the seat-bottom, through the rear bottom of this seat-bottom and through the top of the back-rest, occurs.

Said axis X is here arranged in the vicinity of the pivoting axis H of the hips of the user of the seat (see FIG. 2).

By way of illustration, this axis X is situated at a height of the order of 12 to 15 cm above the lowest point of the middle zone of the bearing surface of the seat-bottom cushion and at a horizontal distance of the order of 15 to 20 cm in front of the base of the middle zone of the bearing surface of the cushion of the back-rest.

The advantage offered by the thus-defined positioning of the axis X will be explained below.

One of the two incurved sectional bars of each pair is provided so as to envelope the other over more than one half of its perimeter so that after the beginning of their mutual interfitting, these sectional bars can be subject, with respect to one another, only to relative "circular" sliding, that is to say for which each movable point is moved along a circular arc centered on the axis X.

For various positions of adjustment, the mutually interfitted portion of the incurved sectional bars corresponds to a relatively large circular arc of axis X, this arc being generally comprised between 45° and 90° and preferably of the order of 60°.

In the first embodiment illustrated in FIGS. 1 to 3, one of the sectional bars 6, connected to the back-rest framework, is a gutter-shaped element having a relatively closed C-shaped profile.

The other sectional bar, whose profile is generally T-shaped, is constituted by a flat projection 7 extending along a portion of a disk and projecting on one of the flanges 1, this projection being formed by stamping said flange and being itself extended radially, both in the direction of the axis X and in the reverse direction, by lugs 8 (FIG. 3) staved in the connecting areas of said projection with the rest of the flange.

The two series of co-planar lugs 8 thus formed are themselves capped permanently by rushes 9, 10 constituted by a plastics material or the like having a low coefficient of friction and a good wear resistance.

It is the two rushes 9, 10 mounted on each projection 7 which are adjacently interfitted inside the gutter element 6, or more precisely it is the latter which straddles adjacently said rushes on the mutual interfitting of the two sectional bars.

The gutter 6 is advantageously constituted by two curved parts $6_1$, $6_2$ centered on the axis X, welded to one another at points 10 and each having a J-shaped cross-section.

One of these parts, $6_1$, in the form of a relatively narrow rod, comprises an upper rectilinear extension 11 oriented upwardly and rearwardly and forming with said part a sort of drawn out bill hook.

The upper end of this extension 11 is beveled at 12 and welded onto the arch member 4 at an upper zone of the latter.

The other part $6_2$, wider than the part $6_1$, is in the general shape of a vertical cheek with rear edge folded back and its upper portion is welded not only to the part $6_1$ and to the bottom of its upper extension 11, but also to the bottom of a limb of the arch member 4.

The rigid triangulated assembly thus formed has high resistance to deformation.

The mounting of the back-rest framework to the seat-bottom framework is carried out by first causing the axes of the sectional bars 6 and 7-10 to coincide, then by ensleeving "circularly" at the end the lower extremities of the gutters 6 of the back-rest onto the upper extremities of the sectional T members 7-10 of the seat-bottom so that each gutter 6 envelopes edge to edge the two linings 9 and 10 capping a projection 7 by being slidable along the latter.

If no intermediate stop is provided, the back-rest framework thus interfitted onto the seat-bottom framework comes by gravity to occupy its lower position to maximum interfitting, which position corresponds to the maximum tilt of the back-rest to the vertical and to mutual contact of stroke-end bearing surfaces provided respectively on the sectional bars and/or on the frameworks.

In reality, the degree of mutual interfitting concerned is limited and regulated as desired by means of an adjusting and locking mechanism which will now be described.

Due to the fact of the particular emplacement indicated above for the axis X, this adjustment for the degree of mutual "circular" interfitting of the curved sectional bars is translated by an adjustment of the tilt of the back-rest around this axis X, resulting in a natural modification of the tilt of the back of the person sitting around his hips, and not by a simple shortening or lengthening of the back-rest without substantial modification of its overall tilt.

The adjusting and locking mechanism concerned comprises:

at least one rack 13 extending around a circular arc centered on the axis X and fast to one of the two curved sectional bars, a rotary toothed member 14 borne by the framework fast to the other curved sectional bar and adapted to cooperate with the rack 13, the rotations of this member being actuated by a handle (not shown) easily accessible to the person sitting on the seat, of which handle the rotations themselves are transmitted in any desirable way to a wheel 15 (FIG. 3) fast to said member 14, and means for locking the toothed member 14 in a plurality of its angular positions corresponding to as many different tilts of the back-rest.

In the embodiment illustrated, the number of circular racks 13 is equal to two and these racks are constituted by cut-out metal plates welded to the vertical cheeks of the parts $6_2$ so that their teeth are oriented downwards and rearwards, whilst the toothed members 14, also two in number, are fast to the same transversal rigid bars 16 borne by the seat-bottom framework, at the rear of the latter, and terminated at its two extremities by the wheels 15.

The toothed members 14 may have any desirable shape: thus they may be constituted by pinions associated with angular locking means.

In the construction illustrated, these toothed members 14 are each constituted by two identical cylindrical pins with axes parallel to the axis X and symmetrical with one another with respect to the axis of the bar 16, which pins are adapted to coact with the teeth of the racks 13.

In addition, the bar 16 is mounted so as to be able to roll and slide edge to edge in two apertures 17 cut out respectively in the two flanges 1 and elongated radially with respect to the axis X, and springs (not shown) are provided to urge the bar 16 constantly forwards and upwards so as to introduce the pins 14 at the bottom of the notches facing the corresponding racks.

Under these conditions, at rest, all the pins are housed at the bottom of such notches and the mechanism is locked.

Starting from such a resting position, the rotations of the actuating handle of the bar 16 are manifested by successive pivotings by 180° of this bar around each of the pairs of coaxial pins situated on each side of the seat, these pairs constituting in turn fixed pivoting spindles for said bar: to each of these successive pivotings corresponds a sliding of the seat-back framework upwards or downwards, that is to say a reduction or increase in its tilt to the vertical around the axis X.

This mechanism has the advantage of ensuring automatically excellent locking for each of its adjusting positions.

In the embodiment shown in FIGS. 4 and 5, the curved sectional bar forming part of the seat-back framework is constituted by a tubular element 18 which can either have an upper rectilinear extension 19 extending upwards and rearwards and welded to the arch member 14 like the extension 11 above, or constitute itself a lower extension of a limb of this arch member. The curved sectional bar forming part of the seat-bottom framework is here constituted by a curvilinear tunnel 20 of square section. This tunnel is itself composed of a curvilinear gutter $20_1$ of rectangular cross-section stamped in a flange 1 and a curvilinear cap $20_2$ having in cross-section the shape of a flattened capital omega whose wings are welded by points 21 to the edges of the gutter $20_1$.

This tunnel 20 is lined internally with sliding linings 22, 23 in the shape of curvilinear angle elements arranged in two opposite corners of said tunnel, which linings play here the role of the rushes 9 and 10 above: the shapes and thicknesses of these linings are selected so that they offer the tube 18 a sliding contact along four narrow plates each extending around a circular arc centered around the axis X.

The cut-out plates 13 are again to be found here serving as racks and adapted to cooperate with pins 14 exactly as in the preceding embodiment: each of these plates 13 is here attached by means of screw 24 to a slightly flattened portion of the tube 18 and each tunnel 20 is perforated by a wide window 25 allowing passage to the corresponding plate-rack 13.

It is to be noted that, in each case, the mutually nested curved sectional bars fill a double role: they serve both as "slip-ways" or slide elements adapted to guide the movements of the back-rest, and strong reinforcing constituent elements of the frameworks or frames of the back-rest and of the seat-bottom.

There is, as a result, a simplification and lightening.

In each case also, the mutual contact surface of the mutually nested curvilinear sectional bars extends circularly over a relatively extended arc, generally over 45° and for example of the order of 60°, and over a relatively long length, the middle line of the nested sections of the sectional bars measuring generally 15 to 25 cm, being notably of the order of 20 cm.

On the other hand, the line corresponding to the cross-section of said mutual contact framework extends over a much smaller length, generally less than 10 cm and rather comprised between 3 and 7 cm.

In other words, the cross-section of the curved sectional bars concerned is relatively small for a given mutual contact surface, which lead, all things being otherwise equal, to a low weight and to low cost price.

It is to be noted in other respects that the proposed formula permits the complete elimination of the usual articulation shaft and hence the elimination through this fact even of the "hard points" which correspond to the presence of this shaft at the rear base of the seat-bottom: this elimination enables a deeper cushioning padding in this zone.

As is self-evident and as emerges already from the foregoing, the invention is not limited in any way to the types of application and embodiments which have been more especially envisaged; it encompasses on the contrary, all modifications.

I claim:

1. A seat, comprising:
   a seat bottom having a framework including two transversally spaced, longitudinally extensive guide members which are arcuately curved about the same axis, that being a horizontally disposed axis which extends tranversally of the seat at a level and position approximating the expected disposition of the pivoting axis of the hips of the seat-user; and
   a back-rest having a framework including two transversally spaced, longitudinally extensive bars which are arcuately curved about said same axis;
   the back-rest being tilt-adjustably mounted to the seat bottom by having said bars telescopically, slidably, interfittingly mounted to respective of said guide members; and
   adjustment and lock means connected between said seat bottom and back-rest for selectively fixing the back-rest at a desired degree of tilt.

2. The seat of claim 1, wherein:
   each bar is telescopically, slidably, interfittingly mounted to the respective said guide member by having one of these perimetrically enclose the other of these throughout more than half of the perimeter of said other.

3. The seat of claim 2, wherein:
   each bar is telescopically, slidably interfittingly mounted to the respective said guide member throughout an arc subtending 45° and 90° about said same axis.

4. The seat of claim 1, wherein:
   each bar is telescopically, slidably, interfittingly mounted to the respective said guide member by having one of these perimetrically enclose the other of these throughout more than three-quarters of the perimeter of said other.

5. The seat of claim 1, wherein:

each bar is telescopically, slidably interfittingly mounted to the respective said guide member throughout an arc subtending 45° and 90° about said same axis.

6. The seat of claim 5, wherein:

each bar is so long relative to each respective guide member, that less than half of the length of each bar is telescopically mountingly related to the respective guide member without respect to the degree of tilting of the back-rest.

7. The seat of claim 6, wherein:

each bar is telescopically, slidably, interfittingly mounted to the respective said guide member by having one of these perimetrically enclose the other of these throughout more than half of the perimeter of said other.

8. The seat of claim 1, wherein:

said bars and said guide members are made of metal, and at least one of said bars and said guide members, is lined with a material having a low coefficient of friction and good wear resistance for facilitating sliding contact.

* * * * *